Jan. 13, 1959 S. D. PHILLIPS 2,868,155
HYDRAULIC POSITION INDICATOR
Filed Jan. 29, 1957 2 Sheets-Sheet 2
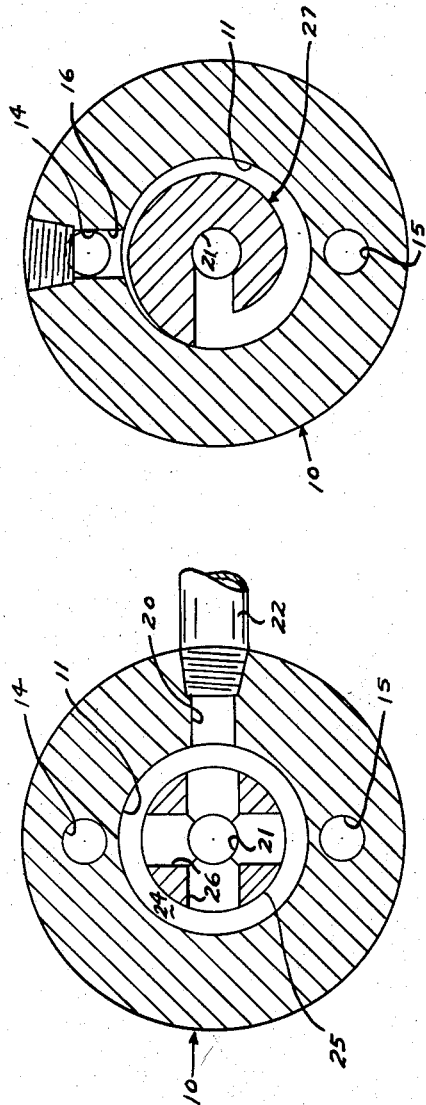
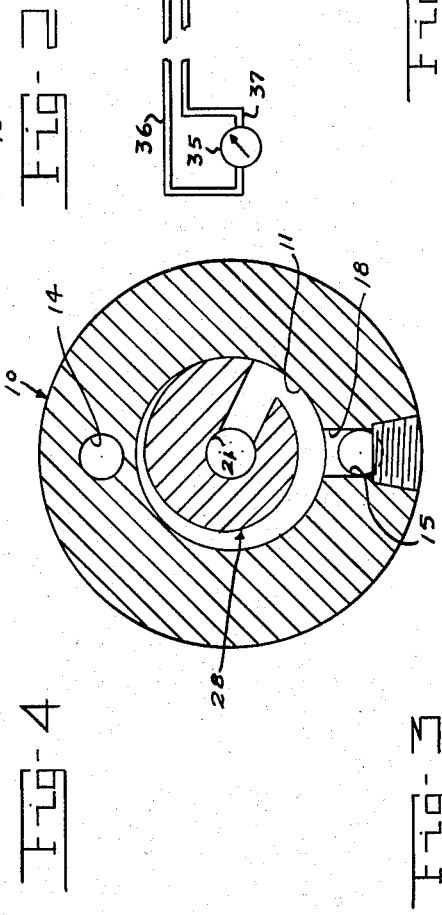
INVENTOR.
STANLEY D. PHILLIPS
BY
ATTORNEYS

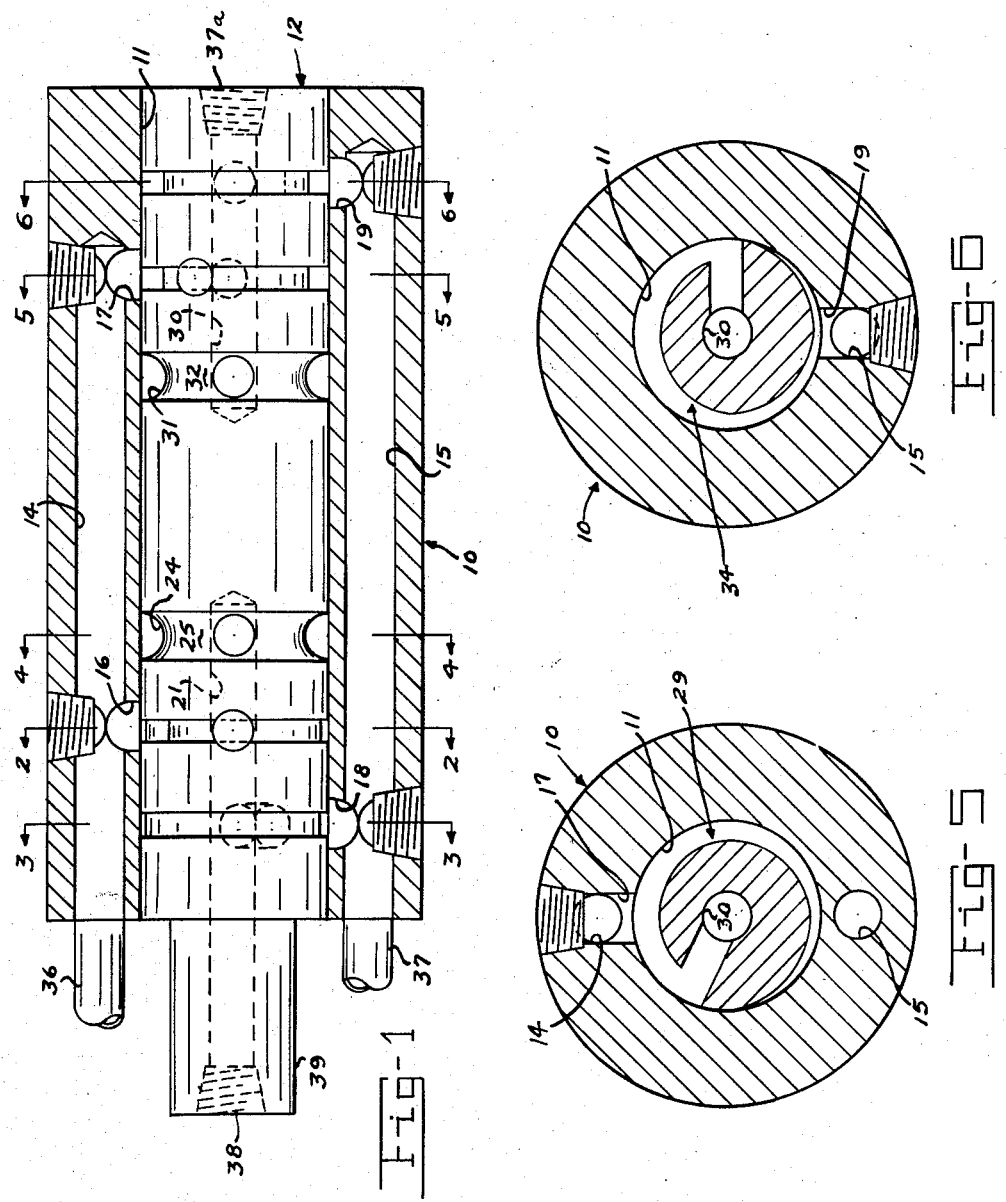

United States Patent Office 2,868,155
Patented Jan. 13, 1959

2,868,155

HYDRAULIC POSITION INDICATOR

Stanley D. Phillips, San Jose, Calif., assignor, by mesne assignments, to the United States of America as represented by the Secretary of the United States Air Force Application January 29, 1957, Serial No. 637,054

5 Claims. (Cl. 116—124)

This invention relates to position indicators and, more particularly, to position indicators of the hydraulic system type for signalling or indicating the position of inaccessible objects.

Position indicators are employed to identify the position of moving or stationary parts, which are totally inclosed, hidden by obstructions, remote, or in a danger zone such as an area too hot or too small or too contaminated for a person to take measurements. Several devices of electrical and hydraulic types exist for producing or indicating dimensional relationship of parts that are remote and disconnected from each other.

One well-known hydraulic device suitable for approximate duplicating or indicating position is the simple two-position displacement device. In this apparatus, a pair of cylinders, which have pistons movable therein, are interconnected by hydraulic lines above and below the pistons. As one of the pistons moves in one direction, the other piston moves in the opposite direction due to the pumping of fluid from the first cylinder to the second cylinder. Thus, when the remote part is connected to one of the pistons and an indicating device is connected to the other piston, the movement of the remote part is transmitted through the pistons to the indicating device. However, a difficulty with this device is the lack of a constant volume of fluid and the use of metallic parts, which gave false readings due to temperature changes and leakage.

The present invention satisfactorily solves this problem by employing a plurality of variable orifices in a pair of hydraulic circuits, which are connected at their common ends. Fluid under constant pressure is supplied at one of the common ends to the two circuits. The variable orifices change the flow through the two circuits in response to any movement of the remote object. Thus, any minute change in the position of the object is accurately transmitted to the indicating device of the present invention since all of the orifices have their size changed in response to any variation in the position of the object.

An object of the present invention is to provide a position indicator that utilizes a hydraulic system to indicate the position of inaccessible objects.

Other objects of this invention may be readily perceived from the following description.

This invention relates to a position indicator including a pair of hydraulic circuits connected at their opposite ends. One of the opposite ends of the circuits is connected to a fluid pressure source while the other of the opposite ends is connected to a drain. Each of the circuits has a pair of means therein to regulate the flow therethrough in response to movement of a device whose location is to be indicated. Suitable means connect the pair of circuits intermediate the pair of regulating means in each of the circuits. The connecting means includes signalling means to indicate the position of the device to be indicated by the pressure differential between the pair of circuits.

The attached drawings illustrate a preferred embodiment of the invention, in which Fig. 1 is a sectional view partly in elevation of the housing and valve of the present invention;

Fig. 2 is a sectional view taken along the line 2—2 of Fig. 1;

Fig. 3 is a sectional view taken along the line 3—3 of Fig. 1;

Fig. 4 is a sectional view taken along the line 4—4 of Fig. 1;

Fig. 5 is a sectional view taken along the line 5—5 of Fig. 1;

Fig. 6 is a sectional view taken along the line 6—6 of Fig. 1; and

Fig. 7 is a schematic view of the housing and valve of Fig. 1 connected to an indicating device and a remote object.

Referring to the drawings and particularly Fig. 1, there is shown a cylindrical housing 10 having a passage 11 extending therethrough in which a cylindrical valve shaft or spool 12 is disposed. The housing 10 has a pair of dimetrically opposed passages 14 and 15 extending from one of the walls of the housing but terminating short of the other wall. The passage 14 communicates with the passage 11 through openings 16 and 17. The passage 15 communicates with the passage 11 through openings 18 and 19.

The housing 10 has a passage 20 (see Fig. 4) extending through a wall thereof transverse to the axis of the passage 11 to connect a passage 21 within the shaft or spool 12 to a suitable source of fluid pressure (not shown). As shown in Fig. 7, the fluid is supplied under pressure to the passage 20 through the conduit 22 having a pressure regulator 23 therein. An annular passage 24 is formed between a reduced portion 25 of the shaft 12 and the passage 11. A plurality of passages 26 in the reduced portion 25 connects the annular passage 24 with the passage 21. Thus, from Fig. 4, it will be seen that fluid flowing through the passage 20 enters the passage 21 through the annular passage 24 and the passages 26. The annular passage 24 insures that fluid always flows into the passage 21 no matter how much the shaft or spool 12 has been rotated.

The flow of fluid from the passage 21 to the passage 14 through the opening 16 is controlled by a valve member 27 formed in the shaft 12. As the shaft or spool 12 rotates (see Fig. 2), the valve member 27 regulates or controls the amount of fluid flowing from the passage 21 into the passage 14. Thus, rotation of the valve member 27 in a counterclockwise direction (see Fig. 2) increases the fluid flow from the passage 21 into the passage 14. Likewise, clockwise rotation of the valve member 27 reduces fluid flow from the passage 21 into the passage 14. As is well known from hydraulics, an increase in fluid flow decreases the pressure drop while a decrease in fluid flow increases the pressure drop.

The shaft or spool 12 has a valve member 28 formed therein for controlling or regulating the flow of fluid from the passage 21 into the passage 15 through the opening 18. However, the construction of the valve member 28 is such that counterclockwise rotation of the valve member 28 decreases fluid flow from the passage 21 to the passage 15; it should be observed that this is the exact opposite result produced by the valve member 27. Thus, the valve members 27 and 28 are cooperating simultaneously whereby one increases fluid flow from the passage 21 while the other decreases fluid flow from the passage 21 and vice versa.

The fluid flowing through the opening 16 into the passage 14 flows therefrom through the opening 17 into the passage 11 (see Fig. 5). The shaft or spool 12 includes a valve member 29 that controls or regulates the quantity of fluid flowing from the passage 14 into a passage 30 in the shaft or spool 12. Whenever the valve member 29 rotates counterclockwise (see Fig. 5), the fluid flow from the passage 14 to the passage 30 is reduced whereas clockwise rotation of the valve member 29 increases fluid flow. It should be noted that the valve member 27 of Fig. 2 is increasing fluid flow into the passage 14 when it is rotated counterclockwise whereas the valve member 29 is decreasing the fluid flow from the passage 14 into the passage 30 when the valve member 29 is rotating counterclockwise. This insures that the pressure change in the passage 14 is produced by both the valve member 27 and the valve member 29. The fluid entering the passage 30 flows into an annular passage 31 formed between a reduced portion 32 of the shaft or spool 12 and the passage 11. It will be understood that the reduced portion 32 has a plurality of passages therein similar to the passages 26 in the reduced portion 25 so that fluid always flows from the passage 30 at any position of rotation of the shaft or spool 12. The annular passage 31 is connected through a passage (not shown), which extends through the wall of the housing transverse to the axis of the passage 11, with a conduit 33 to a drain.

The fluid flowing into the passage 15 through the opening 18 flows therefrom through the opening 19 into the passage 30. The flow of fluid through the opening 19 is regulated or controlled by a valve member 34 (see Fig. 6) formed in the shaft 12. As the valve member 34 rotates counterclockwise, the flow from the passage 15 through the opening 19 into the passage 30 increases whereas clockwise rotation of the valve member 34 decreases this flow. It should be noted that counterclockwise rotation of the valve member 34 increases fluid flow from the passage 15 to thereby decrease the pressure drop whereas counterclockwise rotation of the valve member 28 decreases the fluid flow into the passage 15 and thereby increases the pressure drop. This, of course, produces the same result of dividing the pressure change as does the cooperation of the valve members 27 and 29 controlling the flow through the passage 14.

The passage 14 is connected to one side of an indicating or signalling means 35 (see Fig. 7) by a conduit 36. The passage 15 is connected to the other side of the indicating device 35 by a conduit 37. Thus, the indicating device moves in one direction in response to a pressure increase in the passage 14 and a pressure drop in the passage 15 while the indicating device moves in the opposite direction in response to a pressure increase in the passage 15 and a pressure drop in the passage 14. This produces a change on the indicator of the indicating device 35 for any slight variation in the position of the remote object.

The shaft or spool 12 includes the valve members 27, 28, 29, and 34 so that all of the valve members rotate together. This produces a variation at all four openings, as previously explained, at the same time. It should be noted that the passage 30 is closed by a plug 37a and the passage 21 is closed by a plug 38.

The shaft 12 includes a projecting portion 39, which is connected to the remote object through suitable linkage mechanism. As shown in Fig. 7, the projecting portion 39 is secured to a crank arm 40. The crank arm includes a roller 41, which rides in a groove 42 in a coupling 43 whose position is to be indicated by the present invention.

Considering the operation of the present invention with the coupling 43 of Fig. 7, movement of the coupling 43 in an axial direction perpendicular to the plane of the drawing is transmitted through the roller 41 and the crank arm 40 to the shaft or spool 12. This results in rotation of the shaft or spool 12. The signalling device 35 is graduated to indicate movement of the coupling 43. It will be understood that the signalling device 35 would carry indicator marks depending on the type of remote object, which is to have its position indicated.

The rotation of the shaft or spool 12 results in rotation of the valve members 27, 28, 29 and 34. If the valve members and shaft are assumed to rotate counterclockwise, the pressure within the passage 14 increases since there is less pressure drop from the passage 21 to the passage 14 and a greater pressure drop from the passage 14 to the passage 30. At the same time, counterclockwise rotation of the valve member 28 increases the pressure drop from the passage 21 to the passage 15 while the valve member 34 is decreasing the pressure drop from the passage 15 to the valve 30 so that the pressure within the passage 15 is decreasing. This, of course, produces a movement of the indicator on the indicating device 35. Movement of the coupling 43 in the opposite direction rotates the shaft of spool 12 in a clockwise direction and produces a movement of the indicating device 35 in the opposite direction.

Thus, it will be seen that a pair of hydraulic circuits is provided in the present invention. One of the circuits is from the passage 21 through the passage 14 and the passage 30 while the other circuit is from the passage 21 through the passage 15 to the passage 30. One of the common ends of these two hydraulic circuits is connected to the fluid source under pressure through the passage 21 while the other common end is connected to a drain through the passage 30. The design of the valve members is such that they function as variable orifices in the hydraulic circuits. Thus, the valve members 27 and 29 serve as variable orifices in the hydraulic circuit including the passage 14 while the valve members 28 and 34 serve as variable orifices in the hydraulic circuit including the passage 15.

With four orifices, i. e., the four valve members, changing in size, the accuracy obtained is approximately four times the value as when only one orifice is varied and two times the value as if two orifices were varied. Thus, the system can be made very accurate and sensitive to minute changes. If the rate of orifice change is consistent with the dimensional rate of a moving object, the gauge or indicating device 35 indicates the position of the object. If desired, the present invention could have pressure switches connected to the conduits 36 and 37 to serve as a signalling device for other electrical or hydraulic components. Thus, a certain pressure change within the conduit 36 may be employed to actuate a particular component through a pressure switch connected to this conduit, for example.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

I claim:

1. A position indicator comprising a main housing incorporating a main fluid passageway extending longitudinally thereof and a valve shaft rotatably positioned within the main passageway and adapted for connection to a remote device and including a pair of hydraulic circuits connected at opposite ends and comprising a first common fluid passageway incorporated within said valve shaft and adapted for connection to a source of fluid under pressure, a pair of diametrically opposed fluid passageways incorporated within said main housing in communication with the first common passageway and a second common fluid passageway incorporated within said valve shaft remote and separated from the first common passageway and adapted for connection to a drain, a pair of valve means incorporated in said valve shaft for each of said circuits to regulate the flow through each of said circuits, said valve means regulating the flow in response to movement of the remote device whose location is to be indicated, and conduit means connecting the pair of circuits intermediate the pair of valve regulating means in each of the circuits, said connecting means including signaling means attached at opposite sides to said conduit means to indicate the position of the device to be indicated by the pressure differential between the pair of circuits.

2. A position indicator comprising a cylindrical housing having a longitudinally extending fluid passage and a cylindrical, rotatably mounted, relatively elongated spool positioned therein and including a pair of hydraulic circuits comprising a first fluid admisison passage incorporated in said spool and common to both of said hydraulic circuits, a pair of intermediate fluid passages incorporated in said cylindrical housing in respective communication with said pair of hydraulic circuits and a second common fluid passage incorporated in said spool in communication with the pair of intermediate fluid passages and a pair of valve members on said spool for each of said circuits to respectively regulate flow through each of the circuits, a conduit connected to the circuits between the pair of valve members in each of the circuits, a signal member attached on opposite sides to said conduits, and means adapted to connect the spool and the valve members on said spool to a device whose position is to be indicated on the signal member whereby movement of the device moves the valve members to change the reading on the signal member.

3. A position indicator comprising a rotatably positioned shaft adapted for connection to a remote device and a housing surrounding said shaft and incorporating a main fluid passage and including a pair of hydraulic circuits comprising a first common fluid admission passage incorporated in said shaft, a pair of oppositely disposed intercommunicating fluid passages in respective communication with said first common fluid admission passage and a second common fluid passage in communication with said intercommunicating fluid passages and adapted for connection to a drain, a pair of valve members disposed on said shaft for each of said pair of circuits to regulate fluid flow between the common fluid admission passage and the pair of intercommunicating fluid passages, a conduit connected to each of the pair of intercommunicating fluid passages between each pair of said valve members, means connecting said shaft to the remote device whose position is to be indicated, said means adapted to be moved by the device to move said valve members simultaneously whenever the device moves, said connecting means respectively moving the valve members to reduce flow through one pair thereof in one of the circuits and simultaneously increase flow through said other pair thereof in the other of said circuits, the valve members increasing flow in each of the two circuits being on opposite sides of the conduit connection, and the valve members reducing the flow in the two circuits being on opposite sides of the conduit connection, and visual indicating means attached at opposite sides thereof to each of said conduits to indicate any change in the remote position of the device to be located.

4. A position indicator including a pair of hydraulic circuits connected at opposite ends and comprising a hydraulically operated actuator device adapted for attachment to and operation by a remotely located device whose position is to be indicated comprising an elongated shaft member housed in said actuator device and incorporating a plurality of valve members therealong and a plurality of fluid passages periodically controlled by said valve members forming a pair of hydraulic circuits, said plurality of fluid passages including a fluid admission passage incorporated in said shaft member and constituting one end of each of said hydraulic circuits, a common fluid passage incorporated in said shaft member remote from the fluid admission passage and constituting the opposite end of each of said hydraulic circuits and adapted to be connected to a drain and a pair of oppositely disposed fluid passages in communication between the fluid admission passage and said last named common fluid passage, said plurality of valve members comprising a pair of cooperating valve members mounted in spaced relation on said shaft member and positioned in each of said circuits to regulate the flow therethrough, one of said pair of valve members being positioned in each of said circuits and having a decreasingly effective diameter in one direction of rotation for increasing flow therethrough into one of said pair of hydraulic circuits and the other of said pair of valve members being positioned in each of said circuits and having an increasingly effective diameter in the same direction of rotation for decreasing flow therethrough into the other of said pair of hydraulic circuits, and means connecting the pair of circuits intermediate the pair of valve members in each of the circuits, said connecting means including signalling means to indicate the position of the device to be indicated by the pressure differential effected between the pair of circuits on movement of said shaft member and the valve members incorporated thereon in one or the other direction of rotation.

5. A position indicator according to claim 4 in which said valve member disposed in one of said circuits between the fluid source and the connecting means and said valve member disposed in the other of the circuits between the connecting means and the drain increase flow therethrough simultaneously while said valve member in said one circuit between the connecting means and the drain and said valve member in said other circuit between the fluid source and the connecting means decrease flow therethrough simultaneously or vice versa.

No references cited.